United States Patent

Foller

[11] Patent Number: 6,152,986
[45] Date of Patent: Nov. 28, 2000

[54] METHOD OF ENRICHING CHLORINE GAS

[75] Inventor: Peter C. Foller, Murrysville, Pa.

[73] Assignee: PPG Industries Ohio, Inc., Cleveland, Ohio

[21] Appl. No.: 09/348,695

[22] Filed: Jul. 7, 1999

[51] Int. Cl.[7] ................................................. B01D 53/22
[52] U.S. Cl. ........................ 95/47; 95/51; 95/53; 95/54; 96/10; 96/11
[58] Field of Search ................................... 95/45, 47, 51, 95/54–56; 96/7, 10, 11

[56] References Cited

U.S. PATENT DOCUMENTS

| | | | |
|---|---|---|---|
| 3,874,899 | 4/1975 | Miszenti et al. | 117/66 |
| 4,583,996 | 4/1986 | Sakata et al. | 95/51 X |
| 4,842,620 | 6/1989 | Hammel et al. | 55/16 |
| 4,853,001 | 8/1989 | Hammel | 55/16 |
| 4,888,033 | 12/1989 | Charpin et al. | 55/158 |
| 4,902,307 | 2/1990 | Gavalas et al. | 55/16 |
| 5,089,299 | 2/1992 | Van 'T Veen et al. | 427/245 |
| 5,186,833 | 2/1993 | Mchenry et al. | 210/321.75 |
| 5,250,184 | 10/1993 | Maier | 210/653 |
| 5,342,431 | 8/1994 | Anderson et al. | 95/45 |
| 5,415,891 | 5/1995 | Liu et al. | 95/55 X |
| 5,453,298 | 9/1995 | Gavalas et al. | 95/55 X |
| 5,487,774 | 1/1996 | Peterson et al. | 95/45 |
| 5,538,535 | 7/1996 | Pinnau et al. | 95/41 |
| 5,772,735 | 6/1998 | Sehgal et al. | 95/45 |
| 5,789,024 | 8/1998 | Levy et al. | 427/244 |
| 5,827,569 | 10/1998 | Akiyama et al. | 96/11 X |
| 5,861,049 | 1/1999 | Lokhandwala | 95/39 |

FOREIGN PATENT DOCUMENTS

WO 99/22852  5/1999  WIPO .

OTHER PUBLICATIONS

Dubinin; Adsorption in Micropores, *Journal of Colloid and Interface Science* 1967, 23, 487–499.

Mikhail et al; Investigations of a Complete Pore Structure Analysis, *Journal of Colloid and Interface Science* 1968, 26, 45–53.

*Primary Examiner*—Robert H. Spitzer
*Attorney, Agent, or Firm*—James R. Franks; Irwin M. Stein

[57] ABSTRACT

A method of enriching chlorine gas is described, which method comprises: (a) providing a supported ceramic membrane having a feed side and a permeate side; (b) bringing a feed gas comprising chlorine gas and contaminant gas into contact with the feed side of the ceramic membrane; (c) removing a gaseous permeate depleted in chlorine from the permeate side of the ceramic membrane; and (d) recovering a gas enriched in chlorine from the feed side of the ceramic membrane. The supported ceramic membrane has pore diameters in the range of from 3 angstroms to 12 angstroms. Preferably, the supported ceramic membrane is a substantially cylindrical supported ceramic membrane having a substantially cylindrical internal coaxial passage.

23 Claims, 3 Drawing Sheets

METHOD OF ENRICHING CHLORINE GAS

The present invention relates to a method of enriching chlorine gas. In particular, the method of the present invention involves bringing a feed gas comprising chlorine gas and at least one contaminant gas, such as oxygen and nitrogen, into contact with the feed side of a supported ceramic membrane, removing a gaseous permeate depleted in chlorine from the permeate side of the ceramic membrane, and recovering a gas enriched in chlorine from the feed side of the ceramic membrane. The supported ceramic membrane used in the method of the present invention has pore diameters in the range of from 3 to 12 angstroms.

A large scale commercial method of producing chlorine gas involves the electrolysis of an aqueous solution of sodium chloride (brine) in an electrolytic cell having cathode and anode compartments separated by a diaphragm. During the electrolysis of the brine, hydrogen gas and sodium hydroxide are formed in the cathode compartment, while chlorine gas is formed in the anode compartment of the electrolytic cell. The chlorine gas coproduced during electrolysis typically contains from 95 to 98 percent by volume chlorine gas, with the balance comprising at least one contaminant gas, such as oxygen, nitrogen, carbon dioxide and hydrogen.

Chlorine gas is an important commodity chemical having a number of commercial uses, including for example, the chlorination of alkenes, such as ethylene. The chlorine gas used in many commercial processes is typically required to be of high purity, e.g., containing less than 0.4 percent by volume of contaminant gases. As such, chlorine gas produced during the electrolysis of brine is often purified prior to its use in other chemical processes. A common method of purification involves first drying the low purity chlorine gas in sulfuric acid towers. The dried gas is then compressed and cooled to form noncondensed tail or contaminant gases, which are removed from the condensed and purified liquid chlorine. Since the tail gas can contain as much as 40 percent by volume of chlorine, it is typically further compressed and cooled to collect additional chlorine that was not condensed in the first compression step. The condensed and purified liquid chlorine is then typically revaporized. Chlorine gas isolated by means of compression/liquification processes typically contains 99.6 percent chlorine by volume, based on total volume. The purification of chlorine by means of one or more compression and cooling steps is capital and energy intensive, and the production costs associated therewith can be high.

It would be desirable to develop new methods of purifying or enriching chlorine gas, e.g., chlorine gas formed during the electrolysis of brine. In particular, it would be desirable that such newly developed methods of enriching chlorine not require compression and cooling steps.

U.S. Pat. Nos. 4,853,001 and 4,842,620 describe a method of separating oxygen from a gaseous mixture of oxygen and chlorine. The method of the '001 and '620 patents is described as involving the use of at least one hollow, porous, silica-rich glass fiber that is non-crystalline and has pore sizes having a range of 1 to 50 angstroms in diameter.

U.S. Pat. No. 5,538,535 describes a membrane process for separating chlorine from a chlorine-containing gas stream. The membrane of the '535 patent is described as being a permselective membrane that is selective to chlorine and comprises a rubbery polymer, e.g., crosslinked silicone rubber. The '535 patent describes passing a chlorine-containing gas stream across the feed side of the permselective membrane, and withdrawing a permeate stream enriched in chlorine from the permeate side of the membrane.

U.S. Pat. No. 5,861,049 describes a process for separating chlorine from other low-boiling components of a gas-phase mixture. The method of the '049 patent is described as involving three separation steps: condensation, flash evaporation, and membrane separation. The membrane of the '049 patent is described as being selective to chlorine, and comprises a rubbery polymer, e.g., crosslinked silicone rubber. The membrane separation step of the '049 patent is described as creating a permeate stream enriched in chlorine.

In accordance with the present invention, there is provided a method of enriching chlorine gas comprising:

(a) providing a supported ceramic membrane having a feed side and a permeate side;

(b) bringing a feed gas comprising chlorine gas and contaminant gas into contact with the feed side of said ceramic membrane;

(c) removing a gaseous permeate depleted in chlorine from the permeate side of said ceramic membrane; and (d) recovering a gas enriched in chlorine from the feed side of said ceramic membrane, wherein said ceramic membrane has pore diameters in the range of from 3 angstroms to 12 angstroms.

In accordance with the present invention, there is further provided a method of enriching chlorine gas as described above, wherein step (a) comprises providing at least one substantially cylindrical supported ceramic membrane having a feed side, a permeate side and an internal substantially cylindrical coaxial passage, said ceramic membrane being housed in a casing, the exterior surface of said ceramic membrane and the interior surface of said casing defining an external passage. In a further embodiment of the present invention, the casing is a substantially cylindrical casing, said substantially cylindrical supported ceramic membrane and said substantially cylindrical casing being substantially axially aligned, the inner diameter of said casing being greater than the outer diameter of said ceramic membrane, and the exterior surface of said substantially cylindrical supported ceramic membrane and the interior surface of said substantially cylindrical casing defining said external passage.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Unless otherwise indicated, all numbers or expressions referring to quantities of ingredients, reaction conditions, etc. used in the specification and claims are to be understood as modified in all instances by the term "about."

BRIEF DESCRIPTION OF THE DRAWINGS

In FIGS. 1, 2 and 3 like reference numerals represent the same structural parts, the same process streams and the same conduits. FIGS. 1, 2 and 3 are not drawn to scale.

DETAILED DESCRIPTION OF THE INVENTION

In accordance with the method of the present invention, a feed gas comprising chlorine gas and contaminant gas is brought into contact with the feed side of the ceramic membrane. The feed gas may contain chlorine gas in any amount, e.g., from 1 percent by volume to 99 percent by volume, based on the total volume of the feed gas. In an embodiment of the present invention, the feed gas is obtained from the electrolysis of brine, as discussed previously herein, and contains a major amount of chlorine gas and a minor amount of contaminant gas. Such feed gases typically contain chlorine gas in an amount of from 94.0 percent by volume to 98.8 percent by volume, e.g., from 95.0 to 98.0 percent by volume, based on the total volume of the feed gas.

Feed gas obtained from the electrolysis of brine typically contains a minor amount of contaminant gases, e.g., from 1.2 percent to 6 percent by volume or from 2 percent to 5 percent by volume, based on the total volume of the feed gas. The contaminant gas is typically selected from oxygen, nitrogen, carbon dioxide, hydrogen and mixtures thereof. The contaminant gases are typically present in such feed gas in the following amounts: 0.5 to 3 percent by volume of oxygen, 0.5 to 2 percent by volume of nitrogen, 0.1 to 0.5 percent by volume of carbon dioxide and 0.1 to 0.5 percent by volume of hydrogen, based on the total volume of the feed gas.

The gaseous permeate removed from the permeate side of the ceramic membrane in the method of the present invention typically contains a minor amount of chlorine gas, e.g., from 0.5 percent chlorine by volume to 10 percent chlorine by volume, based on total volume of the gaseous permeate. The balance of the gaseous permeate comprises one or more contaminant gases, such as oxygen, nitrogen, carbon dioxide and hydrogen, that pass through from the feed side of the ceramic membrane to the permeate side of the ceramic membrane, e.g., in amounts of from 90 percent by volume to 99.5 percent by volume, based on the total volume of gaseous permeate.

The gas enriched in chlorine that is recovered from the feed side of the ceramic membrane contains chlorine in a concentration greater than that of the feed gas. For example, when the feed gas is obtained from the electrolysis of brine and contains 94.0 percent by volume of chlorine, based on total volume, the enriched chlorine gas stream typically contains chlorine in an amount greater than 94.0 percent by volume, preferably at least 99.0 percent by volume, and more preferably at least 99.6 percent by volume, based on the total volume of enriched chlorine gas. The recovered enriched chlorine gas stream may be (a) used as is, (b) recycled back to and brought into contact with the feed side of the ceramic membrane for further enrichment, (c) forwarded to the feed side of at least one other ceramic membrane, or (d) a combination of (b) and (c).

The supported ceramic membrane provided in the present invention has pore diameters in a range sufficient to result in the enrichment of feed chlorine gas containing a contaminating amount of other gases, such as oxygen, nitrogen, hydrogen and carbon dioxide. While not intending to be bound by any theory, it is believed that the transport mechanism by which the ceramic membrane enriches the feed chlorine gas involves a combination of Knudsen diffusion, surface diffusion and molecular sieving.

According to Knudsen diffusion theory, the separation of a heavier gas A from a lighter gas B is proportional to the ratio of the square root of their molecular weights. Knudsen diffusion theory predicts that with a mixture of a lighter gas and a heavier gas, the heavier gas will become enriched as the lighter gas diffuses faster through a microporous membrane.

The mechanism of surface diffusion involves gas molecules setting down and moving or hopping from point to point on the surface and within the pores of a microporous membrane. The surface chemistry of the microporous membrane can affect the degree to which surface diffusion governs gaseous transport across the membrane. Surface diffusion mechanisms are thought to become more significant when the pore sizes of the membrane are less than 10 angstroms.

With the mechanism of molecular sieving, the microporous membrane obstructs the passage of gas molecules having sizes, e.g., kinetic diameters, larger than the pore diameters of the membrane, and allows the passage through the membrane of gas molecules having sizes equal to or less than the pore diameters of the membrane. A microporous membrane having molecular sieving properties typically has a narrow range of pore diameters.

As used herein and in the claims, by "supported ceramic membrane" is meant a ceramic membrane having a microporous layer and an integral porous support. The porous support has pore diameters greater than those of the microporous layer. The microporous layer of the supported ceramic membrane may be present (i) on one side of the porous support, (ii) on both sides of the porous support, (iii) within the pores of the porous support, or (iv) as any combination of (i), (ii) and (iii). For purposes of comparison, microporous unsupported ceramic membranes are substantially free of an integral underlying porous support, e.g., as is the case with the silica-rich glass fiber membranes described in U.S. Pat. Nos. 4,853,001 and 4,842,620.

The supported ceramic membrane, and in particular, the microporous layer of the supported ceramic membrane used in the method of the present invention has pore diameters of at least 3 angstroms and preferably at least 3.5 angstroms. The supported ceramic membrane also has pore diameters of less than 12 angstroms, preferably less than 8 angstroms, and more preferably less than 5 angstroms. The supported ceramic membrane of the method of the present invention has pore diameters ranging between any combination of these values, inclusive of the recited values. While the supported ceramic membrane may have pore diameters outside of these ranges, it is desirable that the occurrence of such pore diameters be minimal. Supported ceramic membranes having pore diameters less than 3 angstroms and/or greater than 12 angstroms will not efficiently enrich chlorine gas contaminated with other gases in the method of the present invention.

The pore diameters of the supported ceramic membranes used in the present invention may be determined by known methods. For example, pore diameters can be determined from nitrogen adsorption isotherms as described by Dubinin; Adsorption in Micropores, *Journal of Colloid and Interface Science* 1967, 23, 487–499, and Mikhail et al; Investigations of a Complete Pore Structure Analysis, *Journal of Colloid and Interface Science 1968, 26, 45–53.*

The porous support of the supported ceramic membrane comprises at least one member selected from the group consisting of alumina, ceria, mullite, silica, silicon carbide, silicon nitride, spinel, titania, titanium nitride, zirconia and silica glass. Porous supports may be prepared according to methods known in the art, including, for example, extrusion methods. As is known to the skilled artisan, extrusion methods generally involve, extruding a viscous mixture of sub-micron ceramic powder, e.g., alumina, and a binder, e.g., methylcellulose in water, in a single or twin-screw extruder. The extrudate is either passed through a spinneret to form hollow fibers or tubes, or pressed into a flat sheet, dried at room temperature, and sintered at an elevated temperature, e.g., 1000° C. to 1600° C. An extrusion process by which porous supports may be prepared is discussed in further detail in International Publication No. WO 99/22852.

Preferably the porous support comprises either alumina or silica glass (e.g., pure silica glass and borosilicate glass). Examples of commercially available porous supports include, but are not limited to, BIORAN glass capillaries and tubes, from the Schott Company; VYCOR borosilicate glass tubes from Corning Glass Inc.; and alumina disks from Coors Ceramics. The porous support has pore diameters greater than those of the microporous layer, e.g., from 20 angstroms to 4000 angstroms or from 30 angstroms to 3000 angstroms.

Supported ceramic membranes of the present invention may be prepared by methods which generally involve depositing or forming a microporous ceramic layer on a porous support. Methods by which supported ceramic membranes may be prepared include, but are not limited to, slip casting, chemical vapor deposition (CVD), and thermal vapor deposition (TVD). In an embodiment of the present invention, the microporous layer of the supported ceramic membrane comprises at least one member selected from the group consisting of alumina, ceria, mullite, silica, silicon carbide, silicon nitride, spinel, titania, titanium nitride and zirconia.

Slip casting methods generally involve drawing a suspension, e.g., a colloidal suspension, of sub-micron ceramic material through a porous support, or applying a sol-gel of sub-micron ceramic material to the surface or surfaces of a porous support. The ceramic material applied to the porous support is then dried and sintered to form the microporous layer. Slip casting methods are described in further detail in U.S. Pat. Nos. 5,186,833, 4,888,033 and 3,874,899.

Supported ceramic membranes useful in the present invention are preferably prepared by chemical vapor deposition or thermal vapor deposition methods. Chemical vapor deposition methods generally involve depositing on a porous substrate or support the reaction product of at least two reactive gases. The reactive gases may be passed separately on opposite sides of the porous support to ensure that the reaction product is deposited predominantly within the pores of the support. The chemical vapor deposited reaction product may reside within the pores and/or on the surface of the porous support. The deposited reaction product is the microporous layer.

In a preferred embodiment of the present invention, the microporous layer of the supported ceramic membrane is the chemical vapor deposition product of (i) a first reactant gas, which is the source of the lower atomic weight (e.g., oxygen, nitrogen or carbon) portion of the microporous material, and (ii) a second reactant gas, which is the source of the higher atomic weight (e.g., Si) portion of the microporous material. Preferably, the first reactant gas (i) comprises (ia) a member selected from the group consisting of oxygen, an oxide of nitrogen and mixtures thereof, and (ib) optionally ammonia, and the second reactant gas (ii) is selected from the group consisting of silane ($SiH_4$), ($C_1$–$C_6$) -dialkylsilane and mixtures thereof. The ($C_1$–$C_6$)-dialkylsilanes may be represented by the following general formula I, $$R_1R_2SiH_2 \qquad\qquad I$$

wherein $R_1$ and $R_2$ are each independently selected from $C_1$–$C_6$ linear or branched alkyl, e.g., methyl, ethyl, n-propyl, isopropyl, n-butyl, iso-butyl, tert-butyl, pentyl and hexyl. Examples of oxides of nitrogen include, but are not limited to, nitrous oxide ($N_2O$), nitric oxide (NO), nitrogen dioxide ($NO_2$), nitrogen trioxide ($N_2O_3$) and mixtures thereof. The ($C_1$–$C_6$)-dialkylsilane is preferably selected from diethylsilane, di-tert-butylsilane and mixtures thereof.

A supported ceramic membrane useful in the method of the present invention may be prepared according to the following chemical vapor deposition process. A porous support or substrate, e.g., a porous support comprising borosilicate glass or alumina, having a first surface and a second surface is placed in a suitable reaction vessel. The reaction vessel is partitioned by the porous support, and has a first chamber to which the first surface of the support is exposed, and a second chamber to which the second surface of the support is exposed. The first and second surfaces of the support are heated to and maintained at a temperature of from 350° C. to 600° C. In addition, a pressure gradient is maintained across the porous support, e.g., the first chamber of the reaction vessel is maintained at 760 Torr while the second chamber is maintained at a pressure of from 400 milliTorr to 600 milliTorr. The porous support has pore diameters in the range of from 30 angstroms to 3000 angstroms, and may be substantially planar or flat, or substantially cylindrical or tubular in configuration.

The first reactant gas (i), e.g., nitrous oxide and/or oxygen, is introduced into the first chamber of the reaction vessel and contacts the first surface of the porous support, while concurrently the second reactant gas (ii), e.g., silane and/or diethylsilane, is introduced into the second chamber of the reaction vessel and contacts the second surface of the support. The first and second reactant gases meet within the pores and optionally on the first and/or second surfaces of the porous support and deposit therein and/or thereon a solid chemical vapor deposition product comprising a majority of silicon oxide (—Si—O—).

When the porous support used in the CVD preparation of the supported ceramic membrane is substantially cylindrical, e.g., a VYCOR glass tube, the first surface may be either the inside surface or the outside surface of the support. In the case where the interior surface of a porous tubular support is the first surface, the interior surface of the tubular support defines the first chamber of the reaction vessel in which the CVD process is performed.

When the microporous layer is formed from the chemical vapor reaction product of (i) oxygen and/or an oxide of nitrogen, and optionally ammonia, and (ii) silane and/or one or more ($C_1$–$C_6$)-dialkylsilanes, it typically comprises a major amount (e.g., at least 99 percent by weight, based on total weight of the microporous layer) of silicon oxide (—Si—O—), and optionally minor amounts of polysilicon (—Si—Si—), silicon carbide (—Si—C—) and silicon nitride (—Si—N—). Supported ceramic membranes prepared by CVD methods preferably have pore diameters in the range of 3 angstroms to 7 angstroms, and more preferably in the range of 3 angstroms to 5 angstroms. Supported ceramic membranes useful in the present invention, may be prepared by chemical vapor deposition methods as described in further detail in U.S. Pat. Nos. 5,789,024 and 4,902,307, the disclosures of which are incorporated herein by reference in their entirety.

Thermal vapor deposition methods by which supported ceramic membranes may be prepared, generally involve vaporizing a ceramic material by the application of heat in proximity to the surface of a porous support. The vaporized ceramic material is deposited on the surface of the porous support, thus forming the microporous layer. For example, silica can be deposited on the exterior surface of a BIORAN glass tube from the electron beam evaporation of quartz in an evaporation chamber at a pressure of $10^{-5}$ to $10^{-4}$ Torr. To ensure a uniform deposition of silica, the porous glass tube is preferably rotated during the electron beam evaporation of the quartz. Supported ceramic membranes prepared by thermal vapor deposition methods useful in the present invention have pore diameters in the range of 3 angstroms to 12 angstroms, e.g., 3 angstroms to 8 angstroms. Thermal vapor deposition methods are described in further detail in U.S. Pat. No. 5,250,184, the disclosure of which is incorporated herein by reference in its entirety.

The supported ceramic membrane has a feed side and a permeate side. As used herein and in the claims, the term "feed side" and similar terms refers to that side of the ceramic membrane that is contacted with the feed gas comprising the contaminated or impure chlorine gas. Further, as used herein and in the claims, the term "permeate side" and like terms refers to that side of the ceramic membrane from which gaseous permeate, i.e., the gas separated from the chlorine gas, is removed. The microporous layer of the supported ceramic membrane may be located on the feed side and/or the permeate side of the ceramic membrane. Preferably, the microporous layer is at least located on the feed side of the supported ceramic membrane.

The supported ceramic membrane may be of any suitable geometric configuration, examples of which include, but are not limited to, flat or planar, curved, ribbed or reticulated, substantially cylindrical or tubular and conical. In a preferred embodiment of the present invention, the supported ceramic membrane is substantially cylindrical, having an exterior surface and an interior surface, which defines an internal substantially cylindrical coaxial passage within the cylindrical ceramic membrane. When the supported ceramic membrane is substantially cylindrical, either of the internal or external surfaces may be the feed side of the membrane, while the other side is the permeate side.

The feed and permeate sides of the supported ceramic membrane may be maintained at the same pressure or at different pressures. To increase the rate of enrichment, the feed side of the ceramic membrane is preferably maintained at a pressure greater than that of the permeate side of the membrane. The upper limit of the ratio of the pressure on the feed side of the ceramic membrane to the pressure on the permeate side of the ceramic membrane is typically governed by the operating limits of the ceramic membrane itself and/or the unit or cell in which the ceramic membrane is housed. Typically, the ratio of the pressure on the feed side of the ceramic membrane to the pressure on the permeate side of the membrane is at least 4:1, e.g., at least 8:1 or at least 10:1.

In the method of the present invention, the pressure on the feed side of the supported ceramic membrane is typically from 760 Torr to 6000 Torr, e.g., from 2000 Torr to 5000 Torr, or from 3000 Torr to 4000 Torr. The pressure on the permeate side of the ceramic membrane is typically from 50 Torr to 1500 Torr, e.g., from 100 Torr to 1000 Torr, or from 200 Torr to 450 Torr.

The feed and permeate sides of the supported ceramic membrane may each be maintained independently at any temperature under which the ceramic membrane is operable, e.g., from 10° C. to 500° C. When the feed gas is obtained from the electrolysis of brine, the feed and permeate sides of the ceramic membrane are typically each independently maintained at a temperature of from 25° C. to 100° C. More typically, the feed and permeate sides of the ceramic membrane are each maintained at substantially the same temperature.

The supported ceramic membrane is typically housed in a chlorine gas enrichment unit or cell in the method of the present invention. The casing in which the ceramic membrane is housed may be of any suitable configuration, e.g., substantially cylindrical, square-tubular or recta-tubular. The enrichment unit is partitioned by the ceramic membrane, and has a first chamber to which either the feed side or the permeate side of the ceramic membrane is exposed, and a second chamber to which the other side of the membrane is exposed. When the feed side of the ceramic membrane is exposed to the first chamber of the enrichment unit, a feed gas comprising chlorine gas and contaminant gas is introduced into the first chamber and brought into contact with the feed side of the membrane. A gaseous permeate, which typically comprises a major amount of the contaminant gas, is removed from the second chamber of the enrichment unit to which the permeate side of the ceramic membrane is exposed. A gas enriched in chlorine is recovered from the first chamber of the enrichment unit.

In a preferred embodiment of the present invention, the supported ceramic membrane is a substantially cylindrical supported ceramic membrane having an internal coaxial passage, and is housed in a casing. The exterior surface of the cylindrical ceramic membrane and the interior surface of the casing define an external passage. When the interior surface of the cylindrical ceramic membrane is the feed side, feed gas is brought into contact with the interior surface by introducing it into the internal coaxial passage of the cylindrical ceramic membrane. Gaseous permeate is removed from the external passage, and a gas enriched in chlorine is recovered from the internal coaxial passage of the cylindrical ceramic membrane. When the exterior surface of the cylindrical ceramic membrane is the feed side, feed gas is brought into contact with the exterior surface by introducing it into the external passage. Gaseous permeate is removed from the internal coaxial passage of the cylindrical ceramic membrane, and a gas enriched in chlorine is recovered from the external passage.

Figure 1:
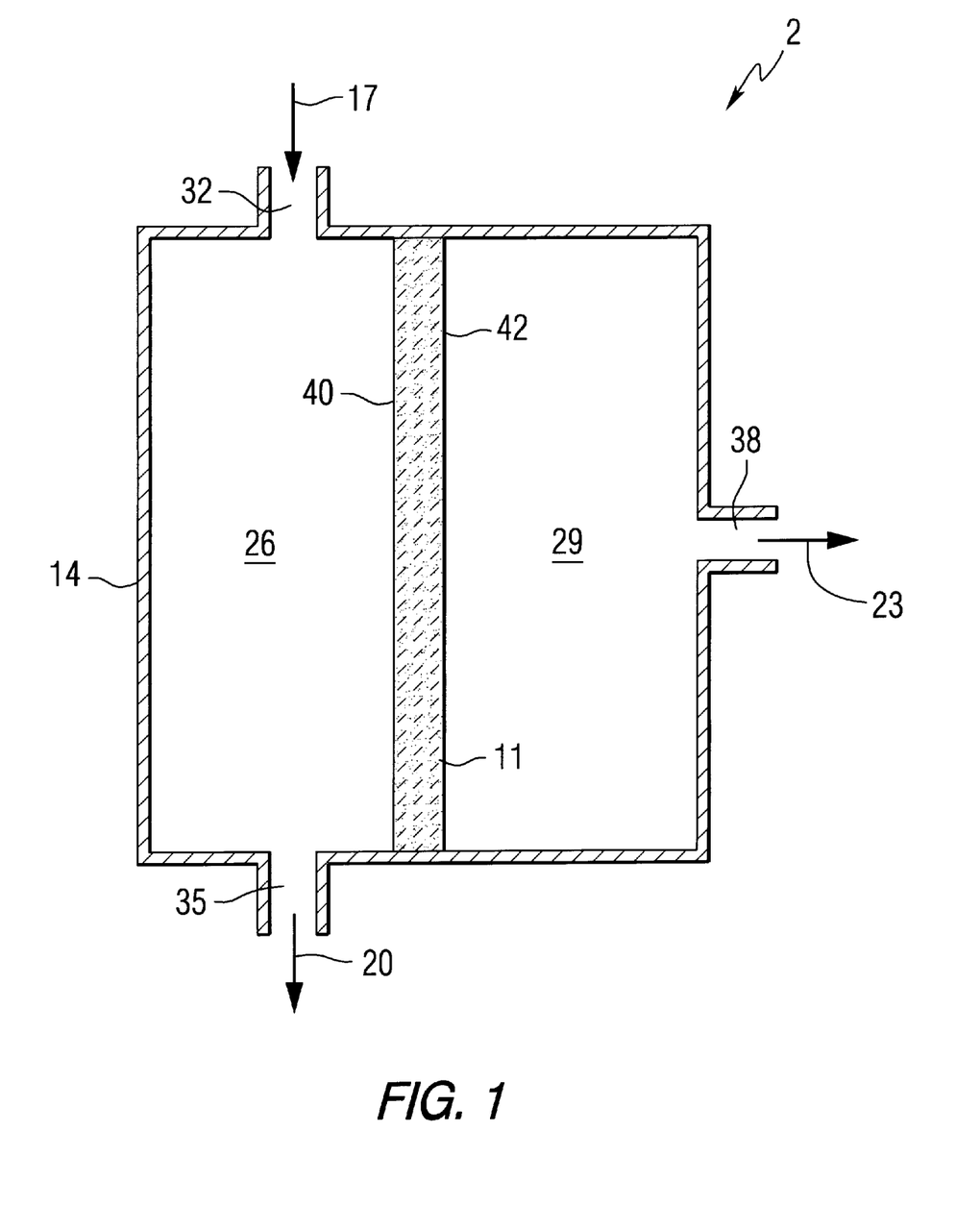
FIG. 1 is a schematic representation of a chlorine gas enrichment unit containing a substantially planar supported ceramic membrane useful in the method of the present invention.

With reference to FIG. 1 of the drawings, a chlorine gas enrichment unit 2, useful in an embodiment of the present invention comprises a housing 14, a feed compartment 26, and a permeate compartment 29. Feed compartment 26 and permeate compartment 29 are partitioned by ceramic membrane 11, having a feed side 40 and a permeate side 42. The feed side 40 of ceramic membrane 11 is exposed to the interior of feed compartment 26, and the permeate side 42 of membrane 11 is exposed to the interior of permeate compartment 29. Feed compartment 26 has an inlet 32 and an outlet 35, and permeate compartment 29 has an outlet 38.

Housing 14 of FIG. 1 is preferably fabricated from materials that are resistant to the corrosiveness of dry chlorine gas. Examples of materials from which housing 14 may be fabricated include, but are not limited to, carbon steel, nickel, and specialty steels including high alloy steels containing nickel, chromium, and molybdenum, e.g., HASTELOY alloys from Haynes International, Inc. Chlorine gas enrichment unit 2 may be assembled by any appropriate method as long as the basic structural configuration depicted in FIG. 1 is retained. For example, the feed and permeate compartments may each be fabricated separately and then assembled by clamping or otherwise fastening the compartments together.

Ceramic membrane 11 of FIG. 1 may be held in place by suitable retaining means, such as nickel or steel-nickel alloy mesh plates, not shown. The microporous layer (not shown) of supported ceramic membrane 11 is preferably located at least on feed side 40.

In accordance with the method of the present invention, and with further reference to FIG. 1 of the drawings, feed gas comprising chlorine gas and contaminant gas is introduced through inlet 32 into feed compartment 26 by means of a suitable conduit, as represented by line 17. The feed gas contacts feed side 40 of ceramic membrane 11, and at least a portion of the contaminant gases that are present in the feed gas, e.g., oxygen and nitrogen, pass from feed side 40 to permeate side 42 of ceramic membrane 11, and enter permeate compartment 29 as gaseous permeate. The gaseous permeate is removed through outlet 38 of permeate compartment 29 by means of a suitable conduit, as represented by line 23. A majority of the chlorine gas in the feed gas is retained on feed side 40 of ceramic barrier 11. A gas enriched in chlorine is recovered through outlet 35 of feed compartment 26 by means of a suitable conduit, as represented by line 20.

Figure 2:
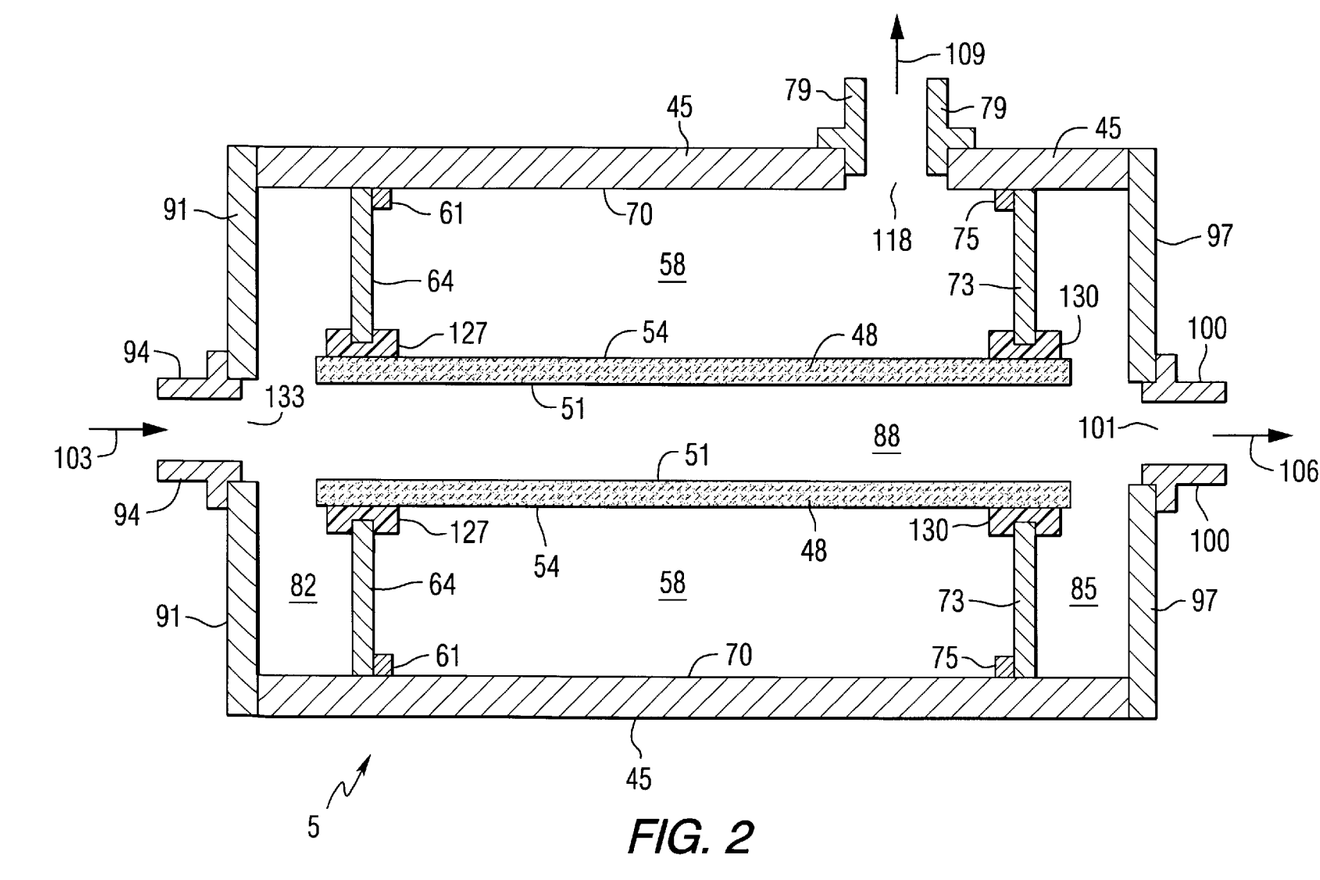
FIG. 2 is a sectional schematic representation of a chlorine gas enrichment unit useful in the method of the present invention, comprising a cylindrical casing and an axially aligned cylindrical supported ceramic membrane, the interior surface of which is the feed side.
Figure 3:
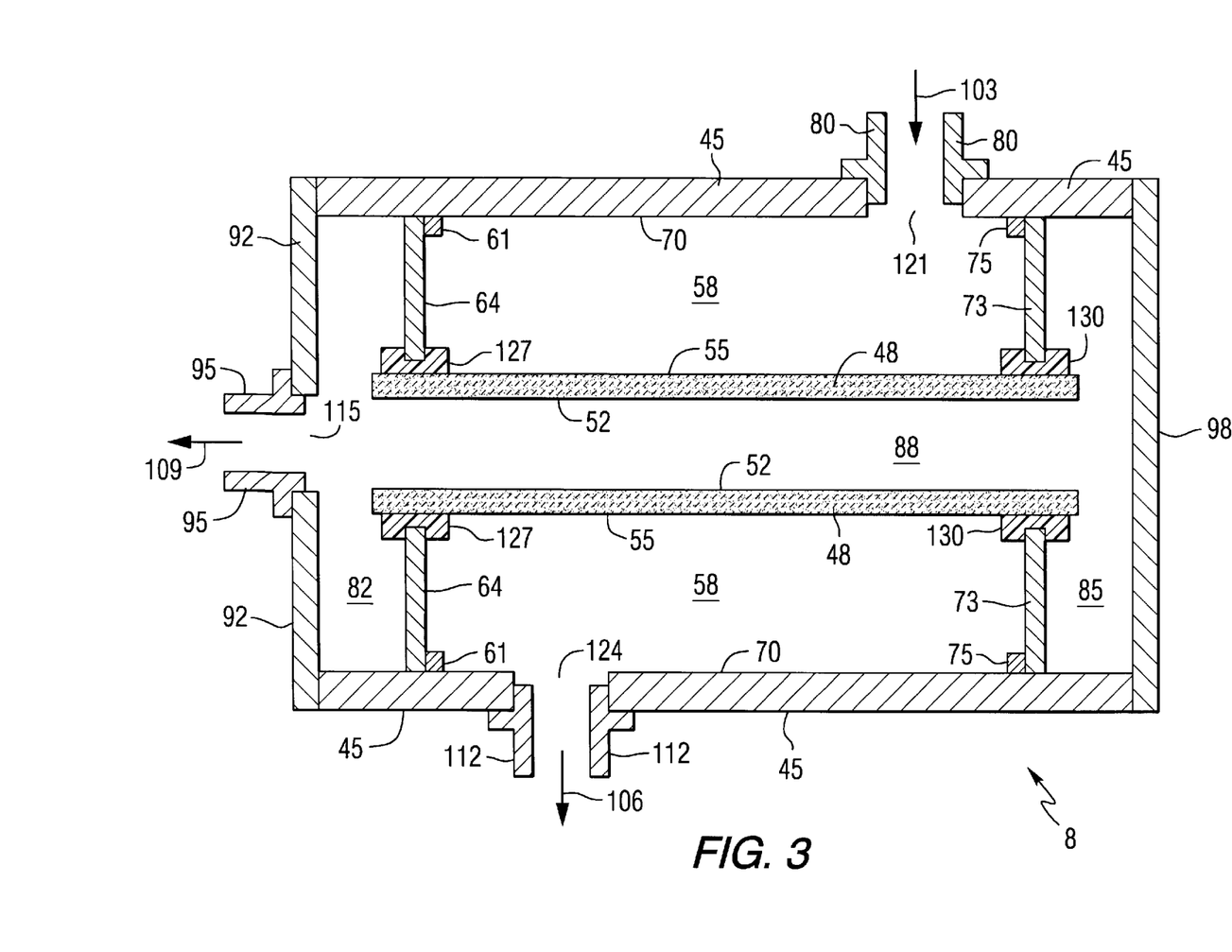
FIG. 3 is a sectional schematic representation of a chlorine gas enrichment unit similar to that of FIG. 2, in which the external surface of the cylindrical supported ceramic membrane is the feed side.

For ease of illustration, the chlorine gas enrichment units represented in FIGS. 2 and 3 of the drawings are each shown as containing a single substantially cylindrical supported ceramic membrane 48. Preferably, chlorine gas enrichment units 5 and 8 of FIGS. 2 and 3 would each contain a plurality of such cylindrical supported ceramic membranes. Aside from ceramic membrane 48, and seals 127 and 130, all of the components of chlorine gas enrichment units 5 and 8 of FIGS. 2 and 3 are preferably fabricated from corrosion resistant metals, such as nickel, steel-nickel alloys and those metals as recited previously herein with regard to housing 14 of unit 2 of FIG. 1. Seals 127 and 130 may be fabricated from corrosion resistant polymeric materials, for example, poly(tetrafluoroethylene).

Chlorine gas enrichment units 5 and 8 may each be assembled by any appropriate method known to the skilled artisan, including, for example, by means of welds, clamps, threaded sections and fasteners, as long as the basic structural configuration depicted in FIGS. 2 and 3 is retained. For example, with unit 5 of FIG. 2 the first and second cylindrical end plates 91 and 97 may each be fastened to the substantially cylindrical casing 45 by means of bolts or welds (not shown). With further reference to FIG. 2, coupling 94 may be retained in opening 133 of plate 91 by means of threads and/or welds (not shown).

With reference to FIG. 2 of the drawings, a chlorine gas enrichment unit 5, useful in a preferred embodiment of the present invention comprises a substantially cylindrical ceramic membrane 48, which is housed in a substantially cylindrical casing 45 having an internal surface 70. Membrane 48 and casing 45 are substantially axially aligned. Cylindrical ceramic membrane 48 has an internal surface 51, an external surface 54 and an internal cylindrical coaxial passage 88 therein. In FIG. 2, internal surface 51 is the feed side of membrane 48, and external surface 54 is the permeate side of membrane 48. The exterior surface 54 of cylindrical ceramic membrane 48 and the interior surface 70 of casing 45 define an external passage 58, more specifically, an external annular passage 58.

Chlorine gas enrichment unit 5 of FIG. 2 has a first external cylindrical plate 91 having an inlet opening 133, which is in gas communication with first manifold space 82, and a first internal cylindrical plate 64 having an aperture therein for engaging sealingly by means of seal 127 with the upstream section of external permeate surface 54 of ceramic membrane 48. Plate 64 abuts sealingly with annular ring 61. Plate 64 and plate 91 together define the first manifold space 82, which is in gas communication with internal cylindrical coaxial passage 88 of ceramic membrane 48. Inlet opening 133 of plate 91 has a coupling 94 therein, which provides gas communication between opening 133 and a suitable conduit, as represented by line 103.

Chlorine gas enrichment unit 5 of FIG. 2 has a second external cylindrical plate 97 having an outlet opening 101, which is in gas communication with second manifold space 85, and a second internal cylindrical plate 73 having an aperture therein for engaging sealingly by means of seal 130 with the down stream section of external permeate surface 54 of ceramic membrane 48. Plate 73 abuts sealingly with annular ring 75. Plate 73 and plate 97 together define second manifold space 85, which is in gas communication with internal cylindrical coaxial passage 88 of ceramic membrane 48. Outlet opening 101 of plate 97 has a coupling 100 therein, which provides gas communication between opening 101 and a suitable conduit, as represented by line 106. Cylindrical casing 45 has an outlet opening 118 that is in gas communication with external annular passage 58. Outlet opening 118 of casing 45 has a coupling 79 therein, which provides gas communication between outlet 118 and a suitable conduit, as represented by line 109.

In accordance with the method of the present invention, and with reference to FIG. 2, feed gas comprising chlorine gas and contaminant gas is introduced through inlet opening 133 into first manifold space 82 by means of a coupling 94 and the conduit represented by line 103. The feed gas passes from manifold space 82 into internal coaxial passage 88, where it contacts internal feed surface 51 of ceramic membrane 48. At least a portion of the contaminant gases present in the feed gas, such as oxygen and nitrogen, pass from internal feed surface 51 to external permeate surface 54 of ceramic membrane 48, and enter external annular passage 58 as gaseous permeate. The gaseous permeate is removed from external annular passage 58 through outlet opening 118 and forwarded for further handling through coupling 79 and the conduit represented by line 109. A majority of the chlorine gas in the feed gas is retained in interior cylindrical passage 88 of ceramic membrane 48. A gas enriched in chlorine passes from internal cylindrical passage 88 of the downstream portion of ceramic membrane 48 into second manifold space 85, from where it is recovered through outlet 101 and forwarded through coupling 100 and the conduit represented by line 106 for further handling, e.g., recycling to inlet opening 103 of unit 5 or other similar units in series with unit 5, or storage, etc.

The ratio of pressure in internal passage 88 of membrane 48 to the pressure in annular passage 58 in unit 5 of FIG. 2 is preferably greater than 1:1, e.g., at least 4:1. Maintaining the ratio of pressure in passage 88 to the pressure in passage 58 at a level greater than 1:1 can be achieved by restricting the flow of the gas enriched in chlorine forwarded through coupling 100 and conduit 106, for example, by means of a valve (not shown). In addition, a vacuum may also be drawn on annular space 58 by means of a vacuum pump (not shown) attached to conduit 109.

In FIG. 3 of the drawings there is depicted a chlorine enrichment unit 8 that is similar to unit 5 of FIG. 2, but in which feed gas comprising chlorine gas and contaminant gas is introduced into external annular passage 58, gaseous permeate is removed from interior cylindrical coaxial passage 88 of ceramic membrane 48, and a gas enriched in chlorine is recovered from external annular passage 58. In chlorine enrichment unit 8 of FIG. 3, external surface 55 is the feed side of ceramic membrane 48, and internal surface 52 is the permeate side of ceramic membrane 48.

Chlorine gas enrichment unit 8 of FIG. 3 has a first external cylindrical end plate 92 having an outlet opening 115, which is in gas communication with manifold space 82. Plates 92 and 64 define manifold space 82. The aperture of plate 64 engages sealingly by means of seal 127 with the upstream section of external feed surface 55 of ceramic membrane 48. Outlet opening 115 of plate 92 has a coupling 95 therein, which provides gas communication between outlet opening 115 and a suitable conduit, as represented by line 109.

Chlorine gas enrichment unit 8 of FIG. 3 has a second external cylindrical end plate 98, which together with second internal cylindrical plate 73, defines second manifold space 85. The aperture of plate 73 engages sealing by means of seal 130 with the downstream section of external surface 55 of ceramic membrane 48. Casing 45 has an inlet opening 121 and an outlet opening 124, each of which is in gas communication with annular passage 58. Inlet opening 121 has a coupling 80 therein, which provides gas communication between inlet 121 and a suitable conduit, as represented by line 103. Outlet opening 124 has a coupling 112 therein, which provides gas communication between outlet 124 and a suitable conduit, as represented by line 106.

In accordance with a further embodiment of the method of the present invention, and with reference to FIG. 3, feed gas comprising chlorine gas and contaminant gas is introduced into external annular passage 58, through inlet opening 121 by means of coupling 80 and the conduit represented by line 103. The feed gas contacts external feed surface 55 of ceramic membrane 48. At least a portion of contaminant gases present in the feed gas, e.g., oxygen and nitrogen, pass from external feed surface 55 to internal permeate surface 52, and enter internal cylindrical passage 88 of ceramic membrane 48 as gaseous permeate. The gaseous permeate passes from internal cylindrical coaxial passage 88 of membrane 48 into manifold space 82, from where it is removed through outlet opening 115, and forwarded through coupling 95 and the conduit represented by line 109 for further handling. A majority of the chlorine gas in the feed gas is retained in annular passage 58. A gas enriched in chlorine is recovered from annular passage 58 through outlet opening 124, and is forwarded through coupling 112 and the conduit represented by line 106.

The ratio of pressure in external annular passage 58 to the pressure in internal cylindrical passage 88 in unit 8 of FIG. 3 is preferably greater than 1 : 1, e.g., at least 4:1. Maintaining the ratio of pressure in passage 58 to the pressure in passage 88 at a level greater than 1:1 can be achieved by restricting the flow of the gas enriched in chlorine forwarded through coupling 112 and conduit 106, for example, by means of a valve (not shown). In addition, a vacuum may also be drawn on internal cylindrical passage 88 by means of a vacuum pump (not shown) attached to conduit 109.

Each of chlorine enrichment units 2, 5 and 8 of FIGS. 1, 2 and 3 may be operated in either a batch or continuous mode. For example, in the batch operation of unit 5 of FIG. 2, outlet opening 101 is sealed by means of a valve, not shown, while a predetermined volume of feed gas comprising chlorine gas and contaminant gas is introduced, preferably under pressure, into passage 88 of ceramic membrane 48, through conduit 103, coupling 94, inlet opening 133 and manifold space 82. When the desired volume of feed gas has been introduced into space 82, internal cylindrical passage 88 and space 85, inlet opening 133 is sealed by means of a valve, not shown. A vacuum may be drawn on annular passage 58 by means of a vacuum pump connected to conduit 109 (not shown), such that the ratio in pressure between internal cylindrical coaxial passage 88 and external annular passage 58 is maintained at a value greater than 1:1, e.g., at least 4:1. When the gas sealed within space 82, internal cylindrical passage 88 and space 85 has reached a desired level of chlorine gas enrichment (e.g., as determined by analysis of samples removed through outlet opening 101) the valve sealing outlet opening 101, not shown, is opened and a gas enriched in chlorine is recovered from manifold space 82, through outlet opening 101 and forwarded through coupling 100 and conduit 106 for additional handling, e.g., storage.

Continuous operation of a chlorine gas enrichment unit in the method of the present invention, is described more specifically with reference to unit 5 of FIG. 2. In the continuous operation of unit 5 of FIG. 2, the feed gas introduced into inlet opening 133 may be adequately enriched in a single pass through internal cylindrical coaxial passage 88 of ceramic membrane 48. Alternatively, the gas enriched in chlorine that is recovered through outlet opening 101 may be recycled back to conduit 103, by means of additional conduits not shown, and reintroduced into the unit through coupling 94 and inlet opening 133.

While FIGS. 1, 2 and 3 depict singular representations of chlorine gas enrichment units, it should be understood that the scope of the present invention is also inclusive of the utilization of a plurality of such units. The present invention may be practiced using a plurality of units, such as nits 2, 5 or 8, either in series or parallel. In an embodiment of the present invention, a plurality of units, not shown, e.g., chlorine gas enrichment unit 5, are utilized in series, wherein outlet opening 101 of each unit is in respective gas communication with inlet opening 133 of each succeeding unit by means of additional conduits, not shown.

Outlet opening 118 of each of the plurality of enrichment units 5 may be in common gas communication with a conduit, not shown, for collective removal of the permeate gas generated in each unit.

In another embodiment of the present invention, a plurality of chlorine enrichment units, e.g., unit 5 of FIG. 2, are utilized in parallel. With reference to unit 5 of FIG. 2, inlet opening 133 of each unit is in common gas communication with a conduit, not shown, carrying feed gas, and outlet opening 101 of each unit is in common gas communication with a conduit, not shown, carrying a gas enriched in chlorine. Outlet opening 118 of each enrichment unit 5 may be in common gas communication with a conduit, not shown, for collective removal of the permeate gas generated in each unit.

The general dimensions and configuration of a chlorine gas separation unit contemplated for use in a preferred embodiment of the method of the present invention can be described with reference to FIG. 2 of the drawings.

Substantially cylindrical casing 45 has a length in excess of 183 centimeters (cm) (6 feet), e.g., 214 cm (7 feet), and an inner diameter of 46 cm (18 inches). Casing 45 as described contains a plurality of substantially cylindrical and equally distributed ceramic membranes 48, e.g., from 250 to 750 cylindrical ceramic membranes, each having a length of 183 cm (6 feet), an outer diameter of 1 centimeter (cm) and a wall thickness of 1 millimeter (mm). Casing 45 and the plurality of ceramic membranes 48 are substantially coaxially aligned. Casing 45 is fabricated from nickel, and the plurality of supported ceramic membranes 48 comprise materials selected from those as described previously herein.

The present invention has been described with reference to specific details of particular embodiments thereof. It is not intended that such details be regarded as limitations upon the scope of the invention except insofar as and to the extent that they are included in the accompanying claims.

What is claimed is:

1. A method of enriching chlorine gas comprising:
   (a) providing a supported ceramic membrane having a feed side and a permeate side;
   (b) bringing a feed gas comprising chlorine gas and contaminant gas into contact with said feed side of said ceramic membrane;
   (c) removing a gaseous permeate from said permeate side of said ceramic membrane; and
   (d) recovering a gas enriched in chlorine from said feed side of said ceramic membrane, wherein said ceramic membrane has pore diameters in the range of from 3 angstroms to 12 angstroms.

2. The method of claim 1 wherein said supported ceramic membrane has a porous support and a microporous layer; said porous support comprising at least one member selected from the group consisting of alumina, ceria, mullite, silica, silicon carbide, silicon nitride, spinel, titania, titanium nitride, zirconia and silica glass.

3. The method of claim 2 wherein said microporous layer comprises at least one member selected from the group consisting of alumina, ceria, mullite, silica, silicon carbide, silicon nitride, spinel, titania, titanium nitride and zirconia.

4. The method of claim 2 wherein said microporous layer comprises the chemical vapor deposition product of (i) a first reactant gas comprising (ia) a member selected from the group consisting of oxygen, an oxide of nitrogen and mixtures thereof, and (ib) optionally ammonia, and (ii) a second reactant gas selected from the group consisting of silane, ($C_1$–$C_6$)-dialkylsilane and mixtures thereof.

5. The method of claim 4 wherein said oxide of nitrogen is selected from nitrous oxide, nitric oxide, nitrogen dioxide, nitrogen trioxide and mixtures thereof; and said dialkylsilane is selected from diethylsilane, di-tertbutylsilane and mixtures thereof.

6. The method of claim 5 wherein said supported ceramic membrane has pore diameters in the range of from 3 angstroms to 5 angstroms.

7. The method of claim 1 wherein the ratio of the pressure on said feed side of said ceramic membrane to the pressure on said permeate side of said ceramic membrane is at least 4:1.

8. The method of claim 1 wherein said feed side of said ceramic membrane is maintained at a pressure of from 2000 Torr to 5000 Torr, and said permeate side of said ceramic membrane is maintained at a pressure of from 100 Torr to 1000 Torr.

9. The method of claim 1 wherein said feed side and said permeate side of said ceramic membrane are each independently maintained at a temperature of from 25° C. to 100° C.

10. The method of claim 1 wherein said feed gas comprises a major amount of chlorine gas and a minor amount of contaminant gas.

11. The method of claim 10 wherein said chlorine gas is present in said feed gas in an amount of from 94.0 percent by volume to 98.8 percent by volume, based on the total volume of said feed gas, and said contaminant gas is selected from the group consisting of oxygen, nitrogen, carbon dioxide, hydrogen and mixtures thereof.

12. The method of claim 11 wherein said gas enriched in chlorine contains chlorine gas in an amount of at least 99.0 percent by volume, based on the total volume of said gas enriched in chlorine.

13. A method of enriching chlorine gas comprising:
   (a) providing at least one substantially cylindrical supported ceramic membrane having a feed side, a permeate side and an internal substantially cylindrical coaxial passage defined by the interior surface of said substantially cylindrical ceramic membrane, said ceramic membrane being housed in a casing, the exterior surface of said ceramic membrane and the interior surface of said casing defining an external passage;
   (b) bringing a feed gas comprising chlorine gas and contaminant gas into contact with said feed side of said ceramic membrane;
   (c) removing a gaseous permeate from said permeate side of said ceramic membrane; and
   (d) recovering a gas enriched in chlorine from said feed side of said ceramic membrane, wherein said ceramic membrane has pore diameters in the range of from 3 angstroms to 12 angstroms.

14. The method of claim 13 wherein said casing is a substantially cylindrical casing, said substantially cylindrical supported ceramic membrane and said substantially cylindrical casing being substantially axially aligned, the inner diameter of said casing being greater than the outer diameter of said ceramic membrane, the exterior surface of said substantially cylindrical ceramic membrane and the interior surface of said substantially cylindrical casing defining said external passage.

15. The method of claim 13 wherein said supported ceramic membrane has a porous support and a microporous layer; said porous support comprising at least one member selected from the group consisting of alumina, ceria, mullite, silica, silicon carbide, silicon nitride, spinel, titania, titanium nitride, zirconia and silica glass.

16. The method of claim 15 wherein said microporous layer comprises at least one member selected from the group consisting of alumina, ceria, mullite, silica, silicon carbide, silicon nitride, spinel, titania, titanium nitride and zirconia.

17. The method of claim 15 wherein said microporous layer comprises the chemical vapor deposition product of (i) a first reactant gas comprising (ia) a member selected from the group consisting of oxygen, an oxide of nitrogen and mixtures thereof, and (ib) optionally ammonia, and (ii) a second reactant gas selected from the group consisting of silane, ($C_1$–$C_6$)-dialkylsilane and mixtures thereof.

18. The method of claim 17 wherein said oxide of nitrogen is selected from nitrous oxide, nitric oxide, nitrogen dioxide, nitrogen trioxide and mixtures thereof; and said dialkylsilane is selected from diethylsilane, di-tertbutylsilane and mixtures thereof, and said supported ceramic membrane has pore diameters in the range of from 3 to 5 angstroms.

19. The method of claim 13 wherein the ratio of the pressure on said feed side of said ceramic membrane to the pressure on said permeate side of said ceramic membrane is at least 4:1, and said feed side and said permeate side of said ceramic membrane are each independently maintained at a temperature of from 25° C. to 100° C.

20. The method of claim 13 wherein said feed gas comprises a major amount of chlorine gas and a minor amount of contaminant gas.

21. The method of claim 20 wherein chlorine gas is present in said feed gas in an amount of from 94.0 percent by volume to 98.8 percent by volume, based on the total volume of said feed gas; said contaminant gas is selected from the group consisting of oxygen, nitrogen, carbon dioxide, hydrogen and mixtures thereof; and said gas enriched in chlorine contains chlorine gas in an amount of at least 99.0 percent by volume, based on the total volume of said gas enriched in chlorine.

22. The method of claim 13 wherein said feed side is the interior surface of said substantially cylindrical ceramic membrane, said feed gas being brought into contact with the interior surface of said ceramic membrane by introducing said feed gas into said internal substantially cylindrical coaxial passage, said gaseous permeate being removed from said external passage, and said gas enriched in chlorine being recovered from said internal substantially cylindrical coaxial passage of said ceramic membrane.

23. The method of claim 13 wherein said feed side is the exterior surface of said substantially cylindrical ceramic membrane, said feed gas being brought into contact with the exterior surface of said ceramic membrane by introducing said feed gas into said external passage, said gaseous permeate being removed from said internal substantially cylindrical coaxial passage of said ceramic membrane, and said gas enriched in chlorine being recovered from said external passage.

* * * * *